United States Patent
Tee et al.

(10) Patent No.: US 7,752,342 B2
(45) Date of Patent: Jul. 6, 2010

(54) INTERFACE INTEGRATED CIRCUIT DEVICE FOR A USB CONNECTION

(75) Inventors: Chee Yen Tee, Singapore (SG); Rajeev Mehtani, Singapore (SG)

(73) Assignee: NXP B.V., Eindhoven (NL)

( * ) Notice: Subject to any disclaimer, the term of this patent is extended or adjusted under 35 U.S.C. 154(b) by 1342 days.

(21) Appl. No.: 10/528,474

(22) PCT Filed: Sep. 12, 2003

(86) PCT No.: PCT/IB03/04018

§ 371 (c)(1),
(2), (4) Date: Mar. 21, 2005

(87) PCT Pub. No.: WO2004/029814

PCT Pub. Date: Apr. 8, 2004

(65) Prior Publication Data

US 2005/0249143 A1    Nov. 10, 2005

(30) Foreign Application Priority Data

Sep. 24, 2002    (SG)    .................. PCT/SG02/00240

(51) Int. Cl.
G06F 3/00 (2006.01)
G06F 13/12 (2006.01)
G06F 13/14 (2006.01)
G06F 13/36 (2006.01)
G06F 13/00 (2006.01)

(52) U.S. Cl. .................. 710/8; 710/62; 710/305; 710/306; 710/311

(58) Field of Classification Search .................. 710/62, 710/8, 305, 306, 311
See application file for complete search history.

(56) References Cited

U.S. PATENT DOCUMENTS

| 6,218,969 | B1 | 4/2001 | Watson et al. |
| 6,338,109 | B1 | 1/2002 | Snyder et al. |
| 6,901,471 | B2 * | 5/2005 | Govindaraman ............ 710/305 |
| 7,003,613 | B1 * | 2/2006 | Wang et al. .................. 710/305 |
| 7,058,747 | B2 * | 6/2006 | Chang et al. ................. 710/305 |
| 2002/0116565 | A1 | 8/2002 | Wang et al. |
| 2003/0163587 | A1 * | 8/2003 | Knight et al. ............... 709/249 |
| 2004/0148539 | A1 * | 7/2004 | Leydier et al. .............. 713/500 |

OTHER PUBLICATIONS

TransDimension, Inc, "OTG243 Product Brief", Mar. 25, 2002, Rev 1.3D, pp. 1-15.*
TransDimension, OTG243 Three Port, Single Chip USB On-The-Go Host/Function Controller, Sep. 24, 2002, Rev. 1.7, <http://datasheet.digchip.com/666/666-00001-0-TD243.pdf>.*

* cited by examiner

*Primary Examiner*—Niketa I Patel

(57) ABSTRACT

An electronic apparatus with a USB connection has a functional circuit with a processor, a parallel address data bus couple to the processor and a USB device controller circuit with a USB interface in parallel with said address/data bus. The apparatus contains an interface integrated circuit electronically between the USB connection on one hand and the parallel address/data interface and the USB interface on the other hand. The interface integrated circuit has external terminals for connecting to a USB bus, a transceiver capable of transceiving for both a USB host and a USB device, the transceiver having a USB interface, a host interface and a device interface. The USB interface is coupled to the USB connection. The device interface is connected to the external USB device controller circuit. A host controller is coupled to the host interface, the host controller being coupled to the functional circuits via the parallel data/address bus.

15 Claims, 2 Drawing Sheets

INTERFACE INTEGRATED CIRCUIT DEVICE FOR A USB CONNECTION

Figure 1:
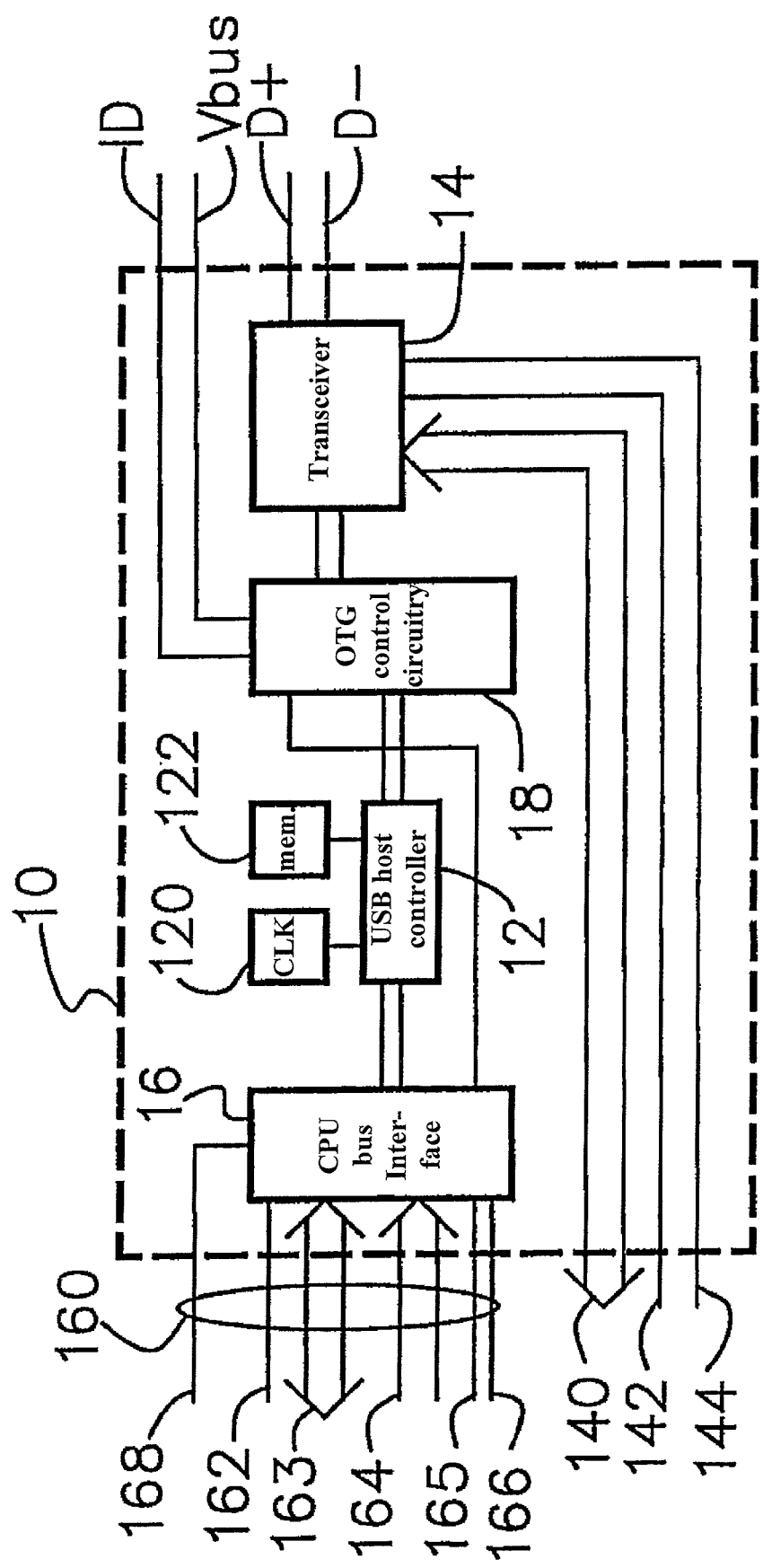

The invention relates to an interface integrated circuit device for interfacing a USB connection to a further circuit.

USB is a popular bus for interfacing peripheral apparatuses to a PC (Personal Computer). USB terminology defines apparatuses either as "host" or as "device". In a USB bus system one of the apparatuses (normally the PC) functions as "host" and the other apparatuses functions as "device". Communication is routed between the apparatus that functions as host and one of the apparatuses that simultaneously function as device. The apparatus that functions as host controls which apparatuses communicate and when.

In the implementation of USB apparatuses with integrated circuits a number of approaches have traditionally been followed. In one approach both the functional circuit of the apparatus (which performs some function that is available via the bus, e.g. a digital camera function) and the USB interface are completely integrated in the same integrated circuit.

In a second implementation approach a functional circuit is augmented with a separate integrated circuit that is used as USB controller. In this approach the USB controller handles the entire USB protocol and the functional circuit interfaces to the USB controller integrated circuit via some standard intra-apparatus interface, such as a memory mapped interface that uses parallel address and data lines. This second approach has the advantage that the controllers can be efficiently mass-manufactured for use with different functional circuits.

In a third implementation approach, a separate transceiver integrated circuit is used. In this approach most of the USB controller function is integrated with the functional circuits, and only the analog signal handling required for USB communication is handled by the transceiver integrated circuit (as used here the word "analog" refers to signal aspects that cannot be fully described by assuming that the signals represent either the number one or the number zero). In this third approach the most signal critical aspects of USB communication are handled by the transceiver. This reduces the severity of the signal handling requirements that must be imposed on the integrated circuit that contains the functional circuits and the controller. Thus, a standard digital circuit can be used for that integrated circuit.

In recent times apparatuses have been developed that can function both as USB host and as USB device. For example, a digital camera with such a capability may be used both as a device that functions as peripheral to a PC and as a host that can interface to a printer with a USB device interface.

The known implementation approaches for conventional USB apparatuses that have been mentioned hereinabove have also been applied to such host/device apparatuses. Specifically in the third approach the transceiver integrated circuit has been expanded to become a so-called OTG (On The Go) transceiver that has a USB interface, a host controller interface and a slave controller interface for connection to host and device controllers respectively. With such a transceiver the USB connection can be interfaced to conventional host and device controllers to control sequencing of USB communication.

In the second approach the host and device controllers have been integrated with the transceiver circuit, the integrated circuit providing an intra-apparatus standard interface for connection to functional circuits. Thus the integrated circuit controls sequencing of USB communication during both host and device operation. Existing functional circuits which are not specific to USB can be readily interfaced to a USB system via the standard interface (e.g. memory mapped) to make an apparatus function selectably as host or as device. In the first approach, finally, integrated circuits can be specifically designed to include both the transceiver, the host controller, the device controller and the functional circuits in an apparatus that can function both as host and as device.

All these approaches have the disadvantage that they fail to fully exploit the availability of existing integrated circuits that provide a USB device controller, but not a USB host controller.

Among others, it is an object of the invention to provide USB apparatuses that are capable of functioning both as host and as device and that more fully use existing circuits that provide a USB device controller.

Among others, it is another object of the invention to provide an interface integrated circuit that enables existing circuits with a USB device capability to function both as a USB device and as a USB host.

The invention provides an integrated circuit according to Claim 1. This integrated circuit includes a transceiver circuit and a USB host controller with a standard interface for use inside an apparatus, but with a connection for an external USB device controller. That is, for the host function the integrated circuit acts as a complete USB interface, whereas for the device function it provides for mere transceiver functionality between its external terminals. Thus, functional circuits with built-in device controller and a standard intra-apparatus bus can be interfaced to a USB bus via the integrated circuit both as host and as device. The integrated circuit supports the novel architectural concept in which two access paths from a functional circuit to the USB connection exist, i.e. a first path that passes only USB device compatible signals and a second path, parallel to the first path, that provides a non-USB standard interface for generating USB host compatible signals.

In an embodiment the device interface that is connected to the external terminals of the integrated circuit is composed of at least two interfaces, comprising an external analog interface (in the sense that a USB transceiver is needed between this interface and the device controller and a digital interface (in the sense that no transceiver is needed between this interface and the device controller). Thus, the integrated circuit supports both existing circuits with and without built-in transceiver to a device controller.

These and other advantageous aspects of the integrated circuit according to the invention will be described in more detail using the following figures.

Figure 2:
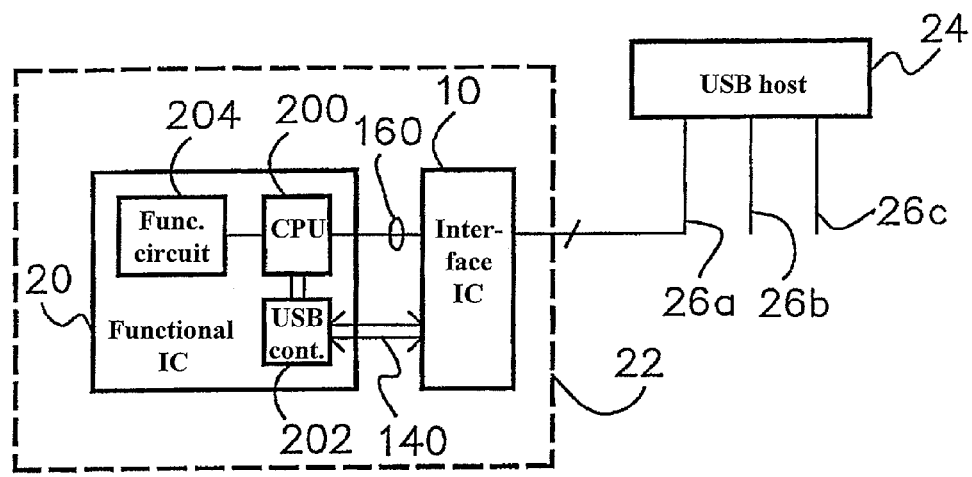
Figure 3:
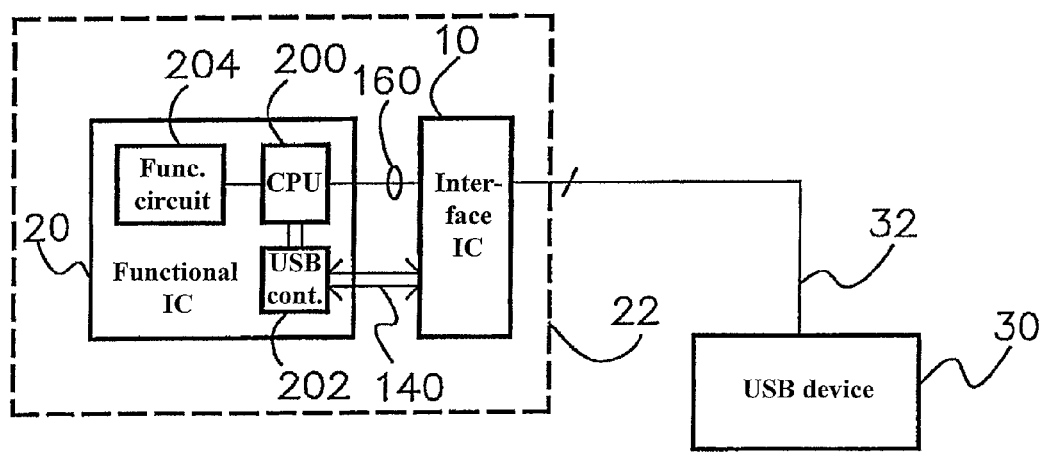

FIG. 1 schematically shows an integrated circuit according to the invention, FIG. 2 shows a USB system, FIG. 3 shows a further USB system.

FIG. 1 schematically shows an interface integrated circuit 10 with a USB connection D+, D−, Vbus, a memory mapped interface 160 and USB device controller interfaces 140, 142, 144 coupled to external terminals of interface integrated circuit 10. Furthermore, although not shown, interface integrated circuit 10 preferably has power supply connections, a reset connection and an input for generating clock signals.

Interface integrated circuit 10 contains a USB host controller 12, an OTG USB transceiver 14, a CPU bus interface unit 16 and OTG ("On The Go") control circuitry 18. The data lines D+, D− of the USB connection are coupled to transceiver 14. OTG control circuitry 18 is coupled between USB host controller 12 and transceiver 14. OTG control circuitry 18 contains a charge pump circuit (not shown) coupled to USB line Vbus, and an input coupled to OTG-USB line ID. Furthermore OTG control circuitry 18 contains registers for storing status information and control bits for executing the OTG-USB host negotiation protocol and the USB session request protocol. USB host controller 12 is coupled to memory mapped interface 160 via CPU bus interface unit 16. Transceiver 14 is coupled to USB device controller interfaces 140, 142, 144.

Interface integrated circuit 10 contains a clock circuit 120 and a buffer memory circuit coupled to USB-host controller 12. Memory mapped bus interface 160 contains parallel bi-directional data lines 163, address lines 164, read/write control lines 165, 166 and an interrupt line 168 coupled to external terminals of interface integrated circuit 10 and CPU bus interface unit 16.

Interface integrated circuit 10 provides an interface to a USB connection that may be used alternately for providing USB host functionality and USB device functionality at the USB connection D+, D−, Vbus. The ID line is used to signal to interface integrated circuit 10 whether operation as USB Host is required or operation as USB device is required. When operation as USB host is required, interface integrated circuit 10 uses internal USB host controller 12 to control USB communication. When operation as USB device is required, interface integrated circuit 10 routes USB communication, preferably after some signal processing, to USB device controller interfaces 140, 142, 144 leaving USB control to circuits (not shown) outside interface integrated circuit 10.

FIG. 2 shows a USB system in which device functionality is provided. The USB system contains a first apparatus 22 (e.g. a digital camera) that functions as a USB device, and a second apparatus 24 (e.g. a PC) that functions as a USB host device. First apparatus 22 contains interface integrated circuit 10, which is shown in FIG. 1, and a functional integrated circuit 20. Second apparatus 24 has a number of USB ports 26a-c (only a single line being shown to symbolize connection to each port 26a-c for the sake of clarity), one of which, here 26a, is coupled to first apparatus 22 via the USB connection of interface integrated circuit 10. The other ports 26b-c may be coupled to other apparatuses (not shown).

Functional integrated circuit 20 contains a CPU 200, a USB device controller 202 and functional circuit 204 for performing some function (such as sampling and/or storing pixel values of camera images). USB device controller 202 is coupled between CPU 200 and the USB device interface of interface integrated circuit 10. Functional circuit 204 is also coupled to CPU 200. CPU 200 is coupled to memory mapped interface 160. Within the functional integrated circuit, memory mapped interface 160 may be coupled to other units, such as an instruction memory (not shown), a data memory (not shown), functional circuit 204 and device controller 202 etc.

One important aspect of the invention is that functional integrated circuit 20 may be an integrated circuit designed to function as a conventional USB device, i.e. not as an OTG apparatus that can be both USB host and USB device. By connecting this functional integrated circuit 20 to a USB connection via interface integrated circuit 10 such a conventional functional integrated circuit can be used in an apparatus 22 that supports OTG, i.e. that can function both as USB host and as USB device. In FIG. 2 functioning as USB device is illustrated.

In operation, second apparatus 24 functions as a USB host, selecting via which of the ports 26a-c USB communication should take place and controlling whether and in which direction first apparatus 22 receives or transmits data. Transceiver 14 is a conventional USB-OTG transceiver (USB On The Go), which is known per se and which receives and transmits USB signals between device controller 202 and second apparatus 24. Transceiver 14 in interface integrated circuit 10 handles "analog" signal processing of the USB signals, such as analog detection of the presence of the host (second apparatus 24), sampling conversion between differential signals on data lines D+, D− into single ended digital signals etc., as well as conversion of single ended signals from device controller 202 into USB signals upon transmission to host apparatus 24. An example of a combination of signal lines that may be used for communication between transceiver 14 and USB device controller 202 is:

OE_Tp_Int_N
VM
VP
RCV
SE0_VM
DAT_VP

The VM and VP lines (which are output lines from interface integrated circuit) reflect single ended values of the D− and D+ lines of the USB connection. These signal lines may be controlled to operate in a selected one of a number of modes, under the control of the content of a mode selection register (not shown) in interface integrated circuit 10. The modes included differential USB signaling modes (VP_YM) and single ended signaling modes (DATSE), and unidirectional bi-directional modes. In a first mode (DAT_SE0), the DAT_VP, SE0_VM lines are used as follows.

The DAT VP line is used to send single ended data to the transceiver, (when OE_TP_INT_N=low), or to receive single ended data from the transceiver, (when OE_TP_INT-N=high).

The SE0_VM pin is used to either force the D+/− outputs of the transceiver to the single ended zero (SE0) state, (when OE_TP_INT_N=low), or to indicate that the D+/− lines are both logic low, (when OE_TP_NT_N=high).

In a second mode (VP_V , the DAT_VP, SE0_VM and RCV pins are used as follows.

The DAT_VP pin is used to drive the level of the D+ pin, (when OE_TP_INT_N=low), or to indicate the logic level on the D+ pin, (OE_TP_INT N=high).

The SE0_VM pin is used to drive the level of the D− pin, (when OE_TP_INT/=low), or to indicate the logic level on the D− pin, (when OE_TP_INT/=high).

The RCV pin is always an output, and comes from a differential receiver (not shown) in the transceiver circuit.

In the unidirectional modes DAT_VP and SEO_VM always are inputs of interface integrated circuit 10. In the bi-directional modes the direction of these signals (input or output) depends on the value of OE_TP_INT_N (as described for the first and second mode). In addition a UART (Universal Asynchronous Receiver/Transmitter) interface mode may be used, in which DAT_VP and SE0_VP are used as receive (RXD) line and transmit line (TXD) line respectively.

In functional integrated circuit 20, device controller 202, which is a conventional USB device controller, processes these signals and communicates with CPU 200 in order to communicate data and or commands from host apparatus 24 or to obtain data that has to be sent to host apparatus 24. The connection between functional integrated circuit 20 and interface integrated circuit 10 via memory mapped interface 160 need not be used during operation as device apparatus. All communication for the USB connection passes via device controller 202 through device controller interface 140 in this case.

FIG. 3 shows how first apparatus 22 may be used as USB host. In this case the USB connection of interface integrated circuit 10 is coupled to a USB interface 32 of a third apparatus 30 that functions as USB device. In this case CPU 200 in functional integrated circuit 20 writes or reads information to or from host controller 12 via memory mapped interface 160, when a computer program executed by CPU 200 indicates that data or commands have to be written or read. Host controller 12, OTG USB transceiver 14 and OTG ("On The Go") control circuitry 18 communicate data and commands via the USB connection of interface integrated circuit 10 as a USB host. This may be done in a way that is known per se. Host controller 12 controls scheduling. OTG control circuitry 18 activates the charge pump and supplies supply power to the Vbus line of the USB connection of the interface integrated circuit (substantially no such power is supplied when operating as USB device). When operating as USB host, device controller interface 140 need not be used. All information for communication via the USB connection passes between functional integrated circuit 20 and interface integrated circuit 10 via memory mapped interface 160.

It will now be appreciated that, the interface integrated circuit realizes a hybrid interface, with a controller function for part of the possible communication and merely a transceiver function for another part of the possible communication (as USB host and as USB device respectively). Furthermore, for USB communication from one USB connection at least two interfaces between interface integrated circuit 10 and functional integrated circuit 20 are provided, i.e. one dedicated interface to USB device controller 202 in functional integrated circuit 20 and one general purpose interface 160. Thus, it has been made possible to use a functional integrated circuit 20 alternatively as USB host and as USB device, although the functional integrated circuit has originally been designed to act merely as a USB device and not as a USB host. No additional device controller is needed in interface integrated circuit 10, which reduces the amount of silicon area needed in interface integrated circuit 10.

As shown in FIG. 1, interface integrated circuit 10 is preferably also provided with a third interface 142, 144 that comprises analog USB signal lines 142, 144 (like D+ and D– that enable interfacing to a functional integrated circuit with a device controller that is integrated with a USB transceiver). The USB transceiver 14 of interface integrated circuit 10 passes analog signals from USB connection D+, D– to this interface 142, 144 in the case of operation as device. Thus, interface integrated circuit 10 provides for the use of different types of functional integrated circuits, with and without built-in transceiver for their device controller.

Although all functional circuits are preferably integrated in fun integrated circuit 20, as shown, it should be understood that, without deviating from the invention, interface integrated circuit 10 may be used in combination with functional circuits that are distributed over a greater number of integrated circuits, and that the functional circuits may in fact contain discrete components. Also, the function of device controller 202 may be partly or entirely performed by CPU 200. In this case CPU 200 communicates USB information either via parallel interface 160 or via dedicated USB interface 140, or 142, 144 dependent on the mode of operation (host or device).

It should be noted that interface integrated circuit 10 permits the hybrid use of modes with different speeds. USB communication can occur, amongst others, in the so-called full-speed mode and in the so-called high speed mode (the latter being faster). Operation in a given mode requires a host apparatus and a device apparatus that both support operation at the speed of the relevant mode. Interface integrated circuit 10 may be designed to operate as a host in a selectable one of different speed modes, under the control of the functional circuits, and as a device in a mode selected by device controller 202. Thus, the speed during operation as device and host, respectively, can be selected independently of one another.

The invention claimed is:

1. An interface integrated circuit device for interfacing a universal serial bus (USB) connection to a further circuit, the interface integrated circuit comprising:
    first terminals for connecting to a USB bus;
    a transceiver for transceiving for both a USB host and a USB device, the transceiver having a USB interface, a host interface and a device interface, the USB interface being coupled to the first terminals;
    second terminals coupled to the device interface for connection to an external USB device controller;
    a host controller coupled to the host interface, the host controller having a parallel data/address bus;
    third terminals coupled to the parallel data/address bus.

2. An integrated circuit device according to claim 1, wherein the device interface comprises both an analog USB device interface and a transceived digital USB device interface for connection to an external USB device controller without and with an external transceiver, respectively.

3. An interface integrated circuit device according to claim 1, wherein the interface integrated circuit does not include a USB device controller.

4. An interface integrated circuit device according to claim 1, wherein the interface integrated circuit is arranged to use USB communication from said host controller via the USB connection in a first speed mode when operating as a USB host and to use USB communication via the USB connection in a second speed mode, different from said first speed mode, as determined by the device controller when operating as a USB device.

5. An electronic apparatus with a universal serial bus (USB) connection, the electronic apparatus comprising:
    a functional circuit with a processor, a parallel address data bus coupled to the processor and a USB device controller circuit with a USB interface in parallel with said address/data bus; and
    an interface integrated circuit electronically between the USB connection on the one hand and the parallel address/data bus and the USB interface on the other hand, the interface integrated circuit including:
        first terminals for connecting to the USB connection;
        a transceiver for transceiving for both a USB host and a USB device, the transceiver having a USB interface, a host interface and a device interface, the USB interface being coupled to the first terminals; the device interface being connected to the USB device controller circuit in said functional circuit; and
        a host controller coupled to the host interface, the host controller being coupled to the processor via the parallel data/address bus.

6. An electronic apparatus according to claim 5, wherein the apparatus is arranged to use USB communication from said host controller via the USB connection in a first speed mode when operating as USB host and to use USB communication via the USB connection in a second speed mode, different from said first speed mode, as determined by the device controller when operating as USB device.

7. An electronic apparatus according to claim 5, wherein the device interface includes both an analog USB device interface and a transceived digital USB device interface for connection to the USB device controller circuit without and with an external transceiver, respectively.

8. An electronic apparatus according to claim 5, wherein the interface integrated circuit does not include a USB device controller.

9. An electronic system comprising:
- a universal serial bus (USB) bus connection;
- a host apparatus and a device apparatus, at least one of the host and the device apparatus including a functional circuit with a processor, a parallel address data bus coupled to the processor and a USB device controller circuit with a USB interface in parallel with said address/data bus; and
- an interface integrated circuit electronically between the USB bus connection on the one hand and the parallel address/data bus and the USB interface on the other hand, the interface integrated circuit including:
    - first terminals for connecting to a the USB bus connection;
    - a transceiver for transceiving for both a USB host and a USB device, the transceiver having a USB interface, a host interface and a device interface, the USB interface being coupled to the first terminals; the device interface being connected to the USB device controller circuit;
    - a host controller coupled to the host interface, the host controller being coupled to the processor via the parallel data/address bus.

10. An electronic system according to claim 9, wherein the device interface includes both an analog USB device interface and a transceived digital USB device interface for connection to the USB device controller circuit without and with an external transceiver, respectively.

11. An electronic system according to claim 9, wherein the interface integrated circuit does not include a USB device controller.

12. An electronic system according to claim 9, wherein the system is arranged to use USB communication from said host controller via the USB connection in a first speed mode when operating as a USB host and to use USB communication via the USB connection in a second speed mode, different from said first speed mode, as determined by the device controller when operating as a USB device.

13. A method of operating an interface integrated in a universal serial bus (USB) system, the method comprising:
- receiving a selection whether the apparatus containing the interface integrated circuit should operate as a USB host or as a USB device;
- transceiving USB signals with a transceiver in the interface integrated circuit;
- sequencing USB communication via the transceiver with a host controller in the interface integrated circuit and communicating USB transceived data to or from functional circuits outside the integrated circuit via a parallel address data interface when USB host operation is selected, and passing USB signals from the transceiver to a device controller in the functional circuits outside the integrated circuit when USB device controller operation is required.

14. A method according to claim 13, wherein passing USB signals from the transceiver to the device controller in the functional circuits outside the integrated circuit includes passing analog USB signals from the transceiver to the device controller when the device controller includes a transceiver and passing transceived digital USB signals from the transceiver to the device controller when the device controller does not include a transceiver.

15. A method according to claim 13, wherein the interface integrated circuit does not include a USB device controller.

* * * * *